United States Patent Office 3,578,391
Patented May 11, 1971

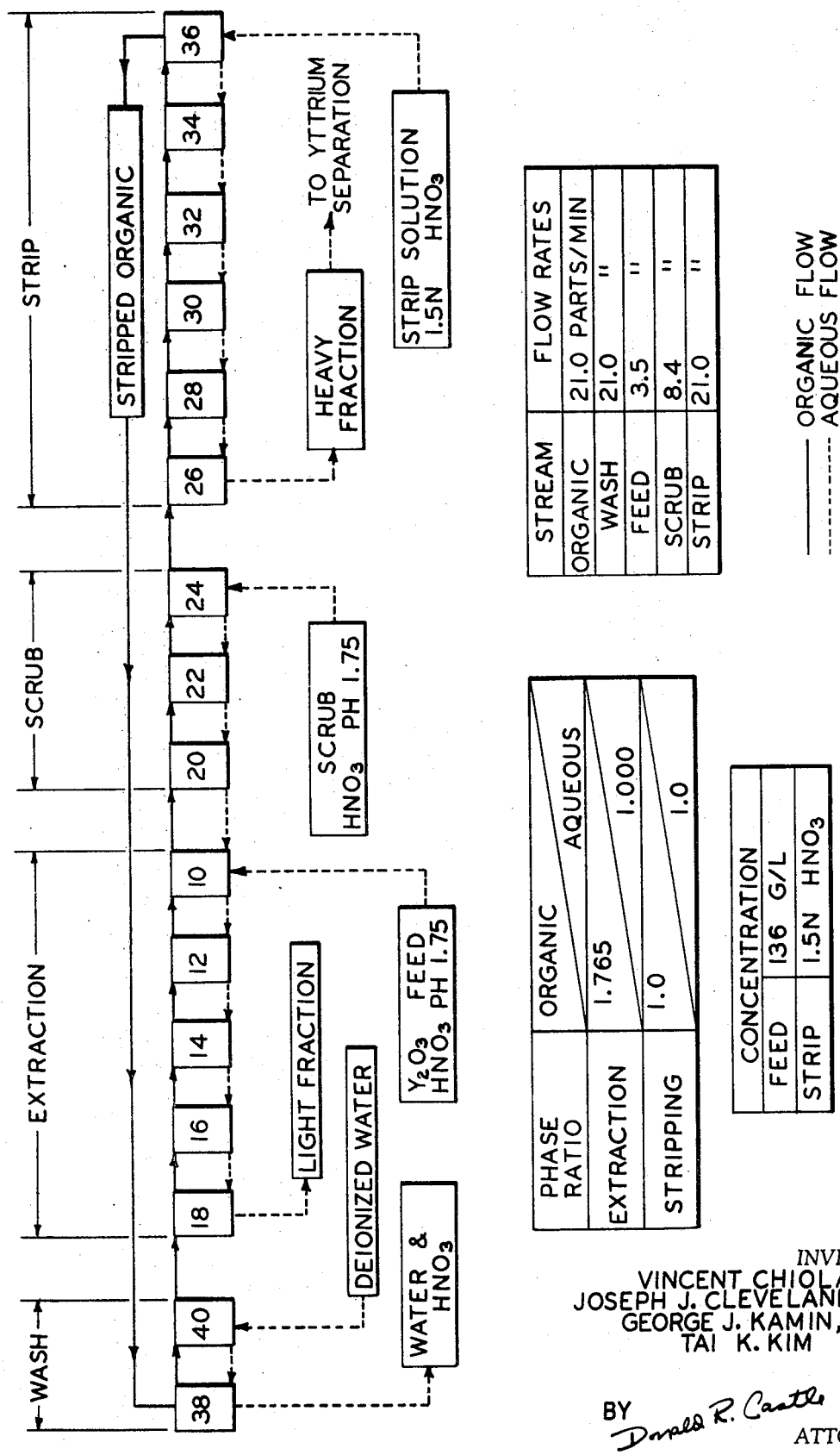

3,578,391
YTTRIUM PURIFICATION
Vincent Chiola, Joseph J. Cleveland, George J. Kamin, and Tai K. Kim, Towanda, Pa., assignors to Sylvania Electric Products Inc.
Filed Sept. 16, 1969, Ser. No. 858,341
Int. Cl. C22b 59/00; C01f 17/00
U.S. Cl. 23—22
8 Claims

ABSTRACT OF THE DISCLOSURE

A continuous process useful for the purification of yttrium from an aqueous solution containing light rare earths, heavy rare earths and yttrium comprising:
(a) an extraction step having a plurality of stages wherein an organic extractant solution consisting essentially of specific alkyl phosphoric acids in specific amounts, tributyl phosphates in specific amounts and a hydrocarbon solvent,
(b) a scrubbing step having a plurality of stages wherein the organic phase from the extraction step is scrubbed with an acidic aqueous scrub solution and the aqueous solution is thereafter recycled to the extractant step,
(c) a stripping step having a plurality of stages wherein the organic phase from the scrubbing step is stripped with an aqueous nitric acid solution to remove yttrium and the heavy rare earths from the organic phase,
(d) a washing step having a plurality of stages wherein the stripped organic phase is contacted with deionized water, and
(e) recycling the organic phase to the extraction step and processing the yttrium bearing aqueous solution to separate yttrium from the heavy rare earths.

CROSS-REFERENCE TO RELATED APPLICATIONS

The combination of a solvent extraction and ion exchange process for the purification and separation of yttrium as disclosed in co-pending U.S. patent application S.N. 703,027, now U.S. Patent 3,482,932 and assigned to the same assignee as the present application enabled major improvements in the purification and separation of yttrium. It has also been shown that further improvements in yttrium separation via solvent extraction can be achieved by control of the pH and the point of recycle of an acidic scrub solution in co-pending U.S. patent application S.N. 858,340, filed concurrently herewith. Each of the above applications are incorporated by reference herein.

Additionally, in co-pending U.S. patent application S.N. 858,515, filed concurrently herewith, there is disclosed that the separation efficiency in the solvent extraction step between light and heavy rare earth elements is improved by the use of a three component extraction solution that contains as active extractants an alkyl phosphoric acid of the class described therein and an organophosphorus compound of the class described therein. As disclosed therein, that application is concerned with extraction efficiency and is applicable to a batch process as well as a continuous process wherein a fractionation between light and heavy rare earths is desired.

BACKGROUND OF THE INVENTION

This invention relates to an improved process for the separation and purification of rare earth elements. More particularly it relates to an improved continuous process for the purification of yttrium.

Separation and purification of rare earth elements in recent years has become important from a commercial standpoint. High purity yttrium sources are required in many instances, such as in the case of rare earth phosphors used in color television. Relatively large quantities of high purity yttrium are required to meet commercial requirements for the color television industry. As can be appreciated, larger capacities and separation efficiencies are beneficial in commercial manufacturing processes.

In a continuous process for the purification of a particular element, other factors such as scrubbing efficiency, overall process efficiency, stripping efficiency, and capacity have major effects upon the effectiveness of a continuous process.

Although the beforementioned processes and improvements have overcome many of the problems heretofore associated with yttrium purification and recovery, there is a need for a process that has a higher degree of flexibility, higher capacity and further increases in separation efficiency.

It is believed, therefore, that a continuous process that enables the processing of larger volumes of rare earth sources that have large variations in rare earth content and enables large increases in rare earth feed concentrations and rare earth throughput while obtaining pure yttrium is an advancement in the art.

SUMMARY OF THE INVENTION

In accordance with one aspect of this invention, there is provided an improvement to a continuous process for the purification of yttrium. This improvement comprises using tridecylphosphoric acid as an active extraction agent and tri-butyl phosphate as a co-extraction agent and solubilizer in specific amounts in conjunction with balancing the number of extraction, scrubbing, stripping and washing stages and use of certain ratios of aqueous and organic solutions.

In accordance with another aspect of this invention there is provided an improvement to a continuous process for the purification of yttrium. This improvement comprises using octyl phosphoric acid as the active extraction agent and tri-butyl phosphate as a co-extraction agent and solubilizer in specific amounts.

For a better understanding of the present invention, together with other and further objects, advantages and capabilities thereof, reference is made to the following disclosure and appended claims in connection with the above description of some of the aspects of the invention.

DESCRIPTION OF THE PREFERRED EMBODIMENTS

In the process of this invention an aqueous phase is first contacted with an organic extraction solution. Counter-current flow is used, that is, the aqueous phase is first contacted with an organic solution that has been in contact with the aqueous phase in a plurality of stages and has extracted a major portion of the heavy rare earths into the organic phase. As used herein, "heavy rare earths" refer to yttrium and rare earths of the lanthanide series having atomic numbers greater than 64. "Lighter rare earths" refers to rare earths of the lanthanide atomic numbers 64 and less. The organic phase is then scrubbed with an acidic scrub solution in a plurality of stages. The organic phase, after scrubbing, is stripped with an aqueous solution of nitric acid in a plurality of stages to remove the heavy rare earths from the organic phase into an aqueous phase that is processed to remove yttrium from the rare earths. The depleted organic phase is washed with deionized water to enable the recycle of the organic extraction solution to the extraction step.

As can be appreciated, an overall efficient system requires efficient extraction, scrubbing, stripping and washing and the proper number of stages at each step. It has been found that for a particular extraction solution the other steps have to be in proper ratio. For example, in the prior art process as disclosed in U.S. patent application Ser. No. 703,027, now U.S. Pat. No. 3,482,932, best results of yttrium purification were achieved with an extraction stage to scrubbing stage ratio of 9:4. In the improved process of this invention using tridecylphosphoric acid as an active extraction agent and tri-butyl phosphate as a co-extractant and solubilizer of the extractant solution, the ratio of extraction stages to scrub stages is from 5:3 to about 8:4 and the addition of a water washing step yield improved results. Additionally, it has been found that by the process of this invention the concentration of rare earth oxides in the feed stream can be increased nearly 3½ times from that in the prior art, thereby resulting in a corresponding capacity increase. Concentrations of rare earth oxides up to about 136 grams/liter can be processed by the process of this invention.

Additionally, it has been found that the use of octyl phosphoric acid as an active extractant and tri-butyl phosphate as a co-extractant and solubilizer improves the efficiency of the solvent extraction step.

To more fully illustrate the present invention, the following detailed examples are presented. All parts, proportions and percentages are by weight unless otherwise indicated.

EXAMPLE I

A first organic extraction solution consisting essentially of about 7% by volume of a mixture of mono-tridecylphosphoric acid and di-tridecylphosphoric acid and about 5% by volume of tri-butyl phosphate and about 88% by volume of kerosene is prepared.

A second organic extraction solution is prepared that is substantially the same as the first solutions except that hexanol is substituted for the tri-butyl phosphate.

An aqueous feed solution is prepared containing a rare earth concentration of about 136 grams per liter (rare earth oxide basis) and at a pH of about 1.8. The distribution of rare earth elements is as follows (on an oxide basis):

$Y_2O_3$ ------------------------------------ 57.9
$Er_2O_3$ ----------------------------------- 5.2
$Ho_2O_3$ ----------------------------------- 3.6
$Dy_2O_3$ ----------------------------------- 9.0
$Yb_2O_3$ ----------------------------------- 4.0
$Tb_2O_3$ ----------------------------------- 0.98
$Sm_2O_3$ ----------------------------------- 1.7
$Gd_2O_3$ ----------------------------------- 4
$Eu_2O_3$ ----------------------------------- 0.1
$Nd_2O_3$ ----------------------------------- 1.7
$Pr_2O_3$ ----------------------------------- 0.55
$CeO_2$ ------------------------------------- 3.5
$La_2O_3$ ----------------------------------- 2.7

Two runs are made using each of the organic extraction solutions.

With particular reference to FIG. 1 the aqueous feed solution is fed to the first stage 10 of the five stage extraction step. The organic extraction solution flows counter-currently to the aqueous feed from the final extraction stage 18 through stages 16, 14, 12 and exiting stage 10.

The organic extraction solution, after exiting from the extraction step, enters the first scrubbing stage 20 and flows through two additional stages 22 and 24. A scrub solution of aqueous nitric acid at a pH of about 1.75 flows counter-current to the organic solution from stages 24 to 22 and exiting from stage 20. The scrub solution is combined with the aqueous feed and enters the first extraction stage 10. The scrubbed organic solution exits from scrubbing stage 24 and then enters the initial stripping stage 26 and flows through five additional stages, 28, 30, 32, 34 and 36. A stripping solution of 1.5 N nitric acid enters at stage 36 and flows counter-current through stages 34 to 26 and exits from that stage for removal of yttrium from the rare earths such as by ion exchange.

The stripped organic is fed to the first washing stage 38 and flows to the second washing stage 40 where it exits before it is used in the extraction step entering at stage 18. In the washing step it is washed with deionized water that enters at stage 40 and after washing exits at stage 38.

In the foregoing process a volumetric ratio of organic to aqueous phases in the extraction step of about 1.8:1 is maintained. In the scrubbing, stripping and washing stages, a volumetric ratio of organic to aqueous of about 1:1 is maintained.

Samples of the heavy fraction after the scrubbing step are taken and the rare earth content is determined by precipitating the rare earths with oxalic acid and converting the precipitated oxalates to oxides by heating the oxalates at about 900° C. for about 1 hour.

Results of the analysis of Run 1 heavy fraction obtained using the first organic extraction solution and Run 2 heavy fraction using the second organic extraction solution are given below. The rare earth content of yttrium and light rare earths is determined by standard X-ray fluorescence techniques. Results are given in percent by weight.

|  | Run | |
| --- | --- | --- |
|  | 1 | 2 |
| $Y_2O_3$ | 72.7 | 66.6 |
| $Sm_2O_3$ | 0.01 | 0.97 |
| $Gd_2O_3$ | 0.05 | 0.46 |
| $Nd_2O_3$ | (¹) | 0.02 |
| $CeO_2$ | 0.04 | 0.05 |

¹ Less than 0.01.

From the above results it is shown that the separation is improved by the process of this invention (Run 1) as in each instance the light rare earth content in the heavy fraction is reduced. The content of gadolinium in the light fraction (Atom No. 64) the heaviest rare earth in the light fraction, is appreciably lower in Run 1. In Run 2, using the prior art process, the gadolinium content is nearly ten times as great as in Run 1 using the process of this invention. To achieve separation approaching that in Run 1 by the process used in Run 2, the rare earth content of the feed stream must be reduced to below 40 grams/liter (oxide basis).

Using essentially the same procedure as in Run 1 except without the water washing step results in cerium buildup in the heavy rare earth fraction. Cerium in that phase is not adequately separated from yttrium by processes known and a low purity yttrium results.

The ratio of extraction to scrub stages can be varied from about 5:3 to about 8:4 with satisfactory results as long as the ratio of scrub plus stripping stages to extraction stages is maintained in ratios of 1:2 to about 2:1. At least two water washing stages are necessary.

Example II

An organic extraction solution containing about 28% by volume of octyl phosphoric acid, about 20% tri-butyl phosphate and about 52% kerosene is prepared.

A similar extraction solution is prepared except that tridecyl phosphoric acid is substituted in equal volumetric amounts.

Each extraction solution is used to contact an aqueous feed stream having a rare earth distribution as shown in Example I and a yttrium oxide concentration of 40 grams liter.

Analysis of the organic and aqueous portions after contact indicate that the separation between the rare earths is essentially the same, however, the extractant solution containing the octyl phosphoric acid can extract up to about 45 grams/liter of yttrium ($Y_2O_3$ basis) whereas the extractant solution containing tridecyl phosphoric acid extracts up to about 30 grams/liter of yttrium ($Y_2O_3$ basis).

While there has been shown and described what is at present considered the preferred embodiment of the invention, it will be obvious to those skilled in the art that various changes and modifications may be made therein without departing from the scope of the invention as defined by the appended claims.

We claim:

1. A continuous process useful for the separation of yttrium and heavy rare earths having an atomic number from 65 through 70 from light rare earths having an atomic number from 57 through 64 comprising:
    (a) an extraction step comprising continuously contacting an aqueous phase containing said light rare earths and said yttrium and heavy rare earths with a water-insoluble organic extractant solution using counter-current flow and in a plurality of stages with separation of the aqueous and organic phases between each stage; said organic extractant solution consisting essentially from about 20% to about 28% by volume of an alkyl phosphoric acid selected from the group consisting of tridecyl phosphoric acid and octyl phosphoric acid, from about 15% to about 20% by volume of tri-butyl phosphate and from about 52% to about 85% of a water insoluble hydrocarbon solvent to form a resultant aqueous phase having a higher concentration of said light rare earths and an organic phase having a higher concentration of said yttrium and heavy rare earths,
    (b) a scrubbing step comprising contacting in multiple step the resultant organic phase with an acidic aqueous scrub solution and recycling the resultant scrub solution to form a portion of said aqueous phase in said extraction step,
    (c) a stripping step comprising contacting in a plurality of stages said organic phase with at least a 1 Normal aqueous nitric acid solution to remove said yttrium and heavy rare earths from said organic phase,
    (d) a washing step comprising contacting the stripped organic phase with deionized water in a plurality of stages, and
    (e) recycling the washed organic phase to said extraction step and recovering the aqueous solution containing yttrium and said heavy rare earths.

2. A process according to claim 1 wherein said alkyl phosphoric acid is a tridecyl phosphoric acid and the ratio of said organic phase to said aqueous phase in said extraction step is from about 1.5:1 to about 1.8:1.

3. A process according to claim 2 wherein the ratio of said extraction stages to said scrubbing stages is from about 5:3 to about 8:4.

4. A process according to claim 3 wherein the ratio of said scrubbing stages and said stripping stages to said scrubbing stage is from about 1:2 to about 2:1.

5. A process according to claim 4 wherein the number of wash stages is at least about 2.

6. A process according to claim 5 wherein the number of extraction stages is at least 5, the number of scrub stages is at least 3 and the number of stripping stages is at least 6.

7. A process according to claim 6 wherein the volumetric ratio of organic to aqueous phase in said scrubbing, stripping and washing step is about 1.

8. A process according to claim 1 wherein said alkyl phosphoric acid is an octyl phosphoric acid.

References Cited

UNITED STATES PATENTS

| | | | |
|---|---|---|---|
| 2,859,094 | 11/1958 | Schmitt et al. | 23—312 (ME) |
| 3,047,601 | 7/1962 | Johnson | 23—23X |
| 3,077,378 | 2/1963 | Peppard et al. | 23—23 |
| 3,214,239 | 10/1965 | Hazen et al. | 23—18X |
| 3,378,352 | 4/1968 | Hausen | 23—312(ME) |
| 3,482,932 | 12/1969 | Gump | 2—22 |

HERBERT T. CARTER, Primary Examiner

U.S. Cl. X.R.

23—312, 23